(12) United States Patent
Kim et al.

(10) Patent No.: US 10,719,209 B2
(45) Date of Patent: Jul. 21, 2020

(54) METHOD FOR OUTPUTTING SCREEN AND ELECTRONIC DEVICE SUPPORTING THE SAME

(71) Applicant: Samsung Electronics Co., Ltd., Suwon-si, Gyeonggi-do (KR)

(72) Inventors: Keun Soo Kim, Gumi-si (KR); Hyun Woong Kwon, Daegu (KR); Jeong Hoon Kim, Gumi-si (KR); Byung Hyuk Moon, Gumi-si (KR); Yong Kwon Kim, Busan (KR); Jong Wu Baek, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 15/463,864

(22) Filed: Mar. 20, 2017

(65) Prior Publication Data

US 2017/0277413 A1  Sep. 28, 2017

(30) Foreign Application Priority Data

Mar. 25, 2016  (KR) .................. 10-2016-0036268

(51) Int. Cl.
*G06F 3/0484* (2013.01)
*G06F 3/0354* (2013.01)
*G06F 3/0488* (2013.01)

(52) U.S. Cl.
CPC ...... *G06F 3/04845* (2013.01); *G06F 3/03545* (2013.01); *G06F 3/0488* (2013.01); *G06F 2203/04804* (2013.01)

(58) Field of Classification Search
CPC . G06F 3/04845; G06F 3/0488; G06F 3/03545
See application file for complete search history.

(56) References Cited

U.S. PATENT DOCUMENTS

| 7,921,373 | B2 | 4/2011 | Yamashita et al. |
| 8,754,831 | B2 | 6/2014 | Kollin et al. |
| 8,934,949 | B2 | 1/2015 | Yeo et al. |
| 9,110,587 | B2 | 8/2015 | Kim et al. |
| 9,323,353 | B1* | 4/2016 | Sivertsen .............. G06F 3/0346 |
| 9,495,805 | B2 | 11/2016 | Shim et al. |
| 2006/0150118 | A1* | 7/2006 | Chaudhri .............. G06F 3/0481 715/800 |

(Continued)

FOREIGN PATENT DOCUMENTS

| CN | 1910547 A | 2/2007 |
| CN | 103838495 A | 6/2014 |

(Continued)

OTHER PUBLICATIONS

Chinese Office Action dated Jul. 15, 2019, issued in Chinese Patent Application No. 201710187845.X.

*Primary Examiner* — Tadesse Hailu
(74) *Attorney, Agent, or Firm* — Jefferson IP Law, LLP

(57) ABSTRACT

An electronic device is provided. The electronic device includes a memory, a display, and a processor electrically connected to the memory and the display. The processor is configured to transparently output a first screen related to a first application, if receiving a user input, change a transparency of at least a partial area of the first screen in correspondence to the user input, and output the first screen on the display.

19 Claims, 12 Drawing Sheets

(56) References Cited

U.S. PATENT DOCUMENTS

| | | | |
|---|---|---|---|
| 2007/0180395 A1 | 8/2007 | Yamashita et al. | |
| 2009/0256814 A1* | 10/2009 | Chung | G06F 1/3215 345/173 |
| 2011/0213655 A1* | 9/2011 | Henkin | G06Q 30/00 705/14.49 |
| 2012/0084691 A1 | 4/2012 | Yun | |
| 2012/0098850 A1* | 4/2012 | Narita | G06F 3/0488 345/589 |
| 2012/0127192 A1* | 5/2012 | Cheong | G09G 5/14 345/589 |
| 2012/0162213 A1 | 6/2012 | Shim et al. | |
| 2012/0274547 A1* | 11/2012 | Raeber | G06F 17/30011 345/156 |
| 2013/0033485 A1 | 2/2013 | Kollin et al. | |
| 2013/0050131 A1* | 2/2013 | Lee | G08G 1/09626 345/174 |
| 2014/0015782 A1* | 1/2014 | Kim | G06F 3/04883 345/173 |
| 2014/0141841 A1 | 5/2014 | Yeo et al. | |
| 2014/0223490 A1* | 8/2014 | Pan | H04N 21/42224 725/61 |
| 2014/0229888 A1* | 8/2014 | Ko | G06F 3/04842 715/783 |
| 2014/0237420 A1* | 8/2014 | Song | G06F 3/04845 715/790 |
| 2014/0245229 A1* | 8/2014 | Jeon | G06F 3/0488 715/846 |
| 2014/0267130 A1* | 9/2014 | Hwang | G06F 3/0488 345/174 |
| 2014/0327634 A1* | 11/2014 | Kim | G06F 21/50 345/173 |
| 2014/0359504 A1* | 12/2014 | Kim | G06F 3/0488 715/768 |
| 2015/0143091 A1* | 5/2015 | Brace | G06F 9/455 713/1 |
| 2015/0161031 A1* | 6/2015 | Chea | G06F 11/3664 717/125 |
| 2015/0277545 A1* | 10/2015 | Flowers | G06F 1/3296 713/323 |
| 2015/0324080 A1* | 11/2015 | Jin | G06F 3/0485 715/784 |
| 2016/0085329 A1* | 3/2016 | Yim | G06F 21/35 345/173 |
| 2016/0179328 A1* | 6/2016 | Yang | G06F 3/0488 715/863 |
| 2016/0253083 A1* | 9/2016 | Lee | G06F 3/04847 715/771 |
| 2016/0364091 A1* | 12/2016 | Bernstein | G06F 3/0416 |
| 2016/0370864 A1* | 12/2016 | Choi | G06F 3/0488 |
| 2017/0046038 A1* | 2/2017 | Hajas | G06F 3/0414 |

FOREIGN PATENT DOCUMENTS

| | | |
|---|---|---|
| KR | 20110042852 A | 4/2011 |
| KR | 20120033515 A | 4/2012 |
| KR | 20120072867 A | 7/2012 |
| KR | 20120078816 A | 7/2012 |
| KR | 20130116167 A | 10/2013 |
| KR | 20140048221 A | 4/2014 |
| KR | 20150050288 A | 5/2015 |

\* cited by examiner

METHOD FOR OUTPUTTING SCREEN AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Mar. 25, 2016 in the Korean Intellectual Property Office and assigned Serial number 10-2016-0036268, the entire disclosure of which is hereby incorporated by reference.

TECHNICAL FIELD

The present disclosure relates to a method for outputting a screen and an electronic device supporting the same.

BACKGROUND

Electronic devices, such as smailphones and tablet personal computers (PCs), may perform various functions, such as, voice communication, wireless data communication, reproduction of videos, capturing of pictures or videos.

Such an electronic device may execute a plurality of applications at the same time, and may output screens for the plurality of applications in various manners. For example, the electronic device may output one application screen selected from a plurality of application screens through multi-tasking. As another example, the electronic device may divide the screen into a plurality of areas through a multi-window, and may output two or applications at the same time.

When the electronic device according to the related art outputs screens for a plurality of applications, a multi-window from which two or more applications are output at the same time may be used or a screen is converted through selection by a user. In this case, in order that the user may identify (e.g., identify a message or identify a webpage) execution of another application, an application output through a screen has to be converted or has to be identified while the screen is divided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present disclosure, an electronic device is provided. The electronic device includes a memory, a display, and a processor electrically connected to the memory and the display. The processor is configured to transparently output a first screen related to a first application, if receiving a user input, change a transparency of at least a partial area of the first screen in correspondence to the user input, and output the first screen on the display.

In accordance with an aspect of the present disclosure, a method of outputting a screen performed by an electronic device is provided. The method includes transparently outputting a first screen related to a first application, receiving a user input, changing a transparency of at least a partial area of the first screen in correspondence to the user input, and outputting the partial area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
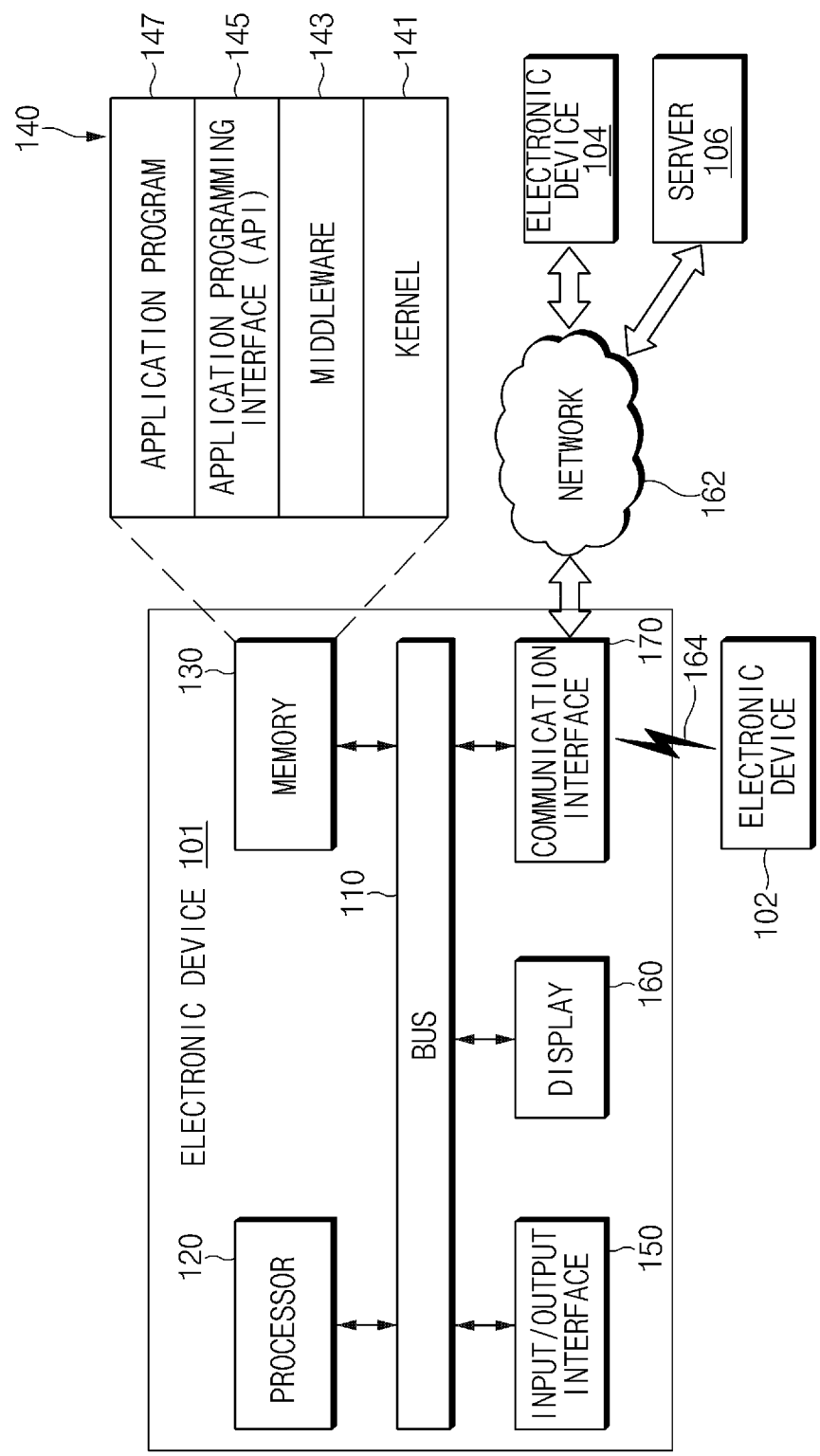
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have," "may have," "include," and "comprise," or "may include" and "may comprise" used herein indicate existence of corresponding features (for example, elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of" The term "configured to (or set to)" must not mean only "specifically designed to" in hardware. Instead, the expression "a device configured to" may mean that the device is "capable of" operating together with another device or other components. A central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer-3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device in a network environment according to various embodiments of the present disclosure.

Referring to FIG. 1, an electronic device 101 in a network environment 100 according to various embodiments will be described.

An electronic device 101 in a network environment 100 according to various embodiments of the present disclosure will be described with reference to FIG. 1. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 120, 130, 150, 160, and 170 to each other and transferring communications (e.g., control messages and/or data) among the above-mentioned elements.

The processor 120 may include at least one of CPU, an AP, or a communication processor (CP). The processor 120 may perform data processing or an operation related to communication and/or control of at least one of the other elements of the electronic device 101.

According to various embodiments, the processor 120 may transparently output a screen on at least one application (hereinafter, an application) that may be executed by the electronic device 101. A user may not perceive a transparently output application or may not be interested in the application.

According to various embodiments, if a user input (e.g., a hovering input of a touch pen) occurs, the processor 120 may adjust a transparency of at least a portion of a screen of the transparently output application in correspondence to a user input. The area having the adjusted transparency may be viewed to the user, and the user may identify an execution screen of another application without converting the screen to a separate screen through the corresponding area. Additional information on adjustment of the transparency of the application screen may be provided through FIGS. 2A, 2B, 3, 4, 5, 6, 7, 8, and 9 based on a user input.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application program 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communications may include, for example, short-range communications 164. The short-range communications may include at least one of wireless fidelity (Wi-Fi), Bluetooth (BT), near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a POS device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first external electronic device 102, the second external electronic device 104, or the server 106). When the electronic device 101 should perform a certain function or service automatically or in response to a request, the electronic device 101 may request at least a portion of functions related to the function or service from another device (e.g., the first external electronic device 102, the second external electronic device 104, or the server 106) instead of or in addition to performing the function or service for itself. The other electronic device (e.g., the first external electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2A:
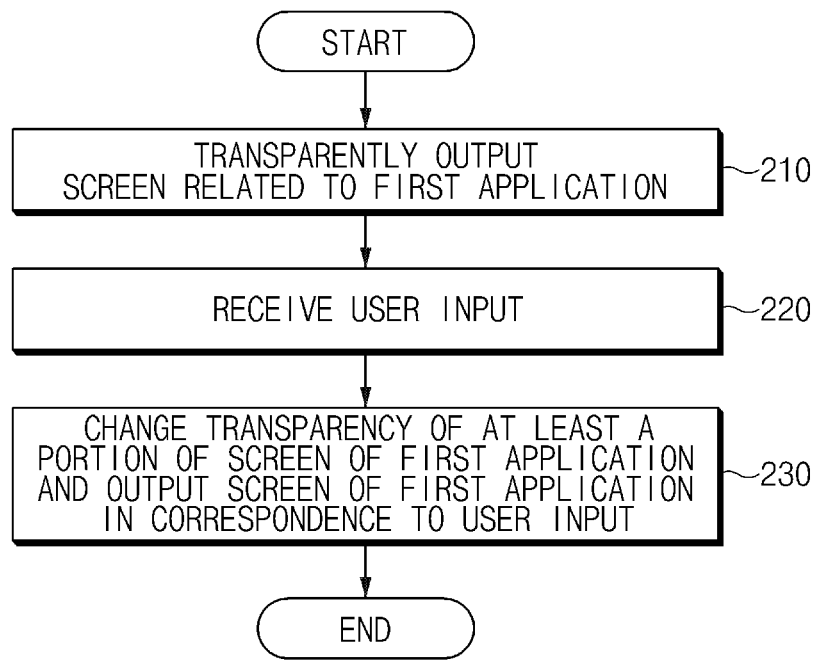
FIG. 2A is a flowchart illustrating a method for outputting a screen according to various embodiments of the present disclosure.

FIG. 2A is a flowchart illustrating a method for outputting a screen according to various embodiments of the present disclosure.

Referring to FIG. 2A, in operation 210, the processor 120 may transparently (e.g., a transparency of 100%) output a screen (a first screen) (e.g., an execution screen) related to a first application. The first application may be one of apps of various forms, such as a message application, an internet browser application, and a shopping application. When a separate user input (e.g., a hovering input of a touch pen) is not made, the screen related to the first application may not be viewed to a user. The first application may be the same as a general application, and may be displayed in a transparent state and may be output such that the user cannot view contents displayed on the screen.

According to various embodiments, when the screen related to the first application is output transparently, the display of the electronic device may display a screen of another application, output a locked screen or a home screen, or be a screen off state.

According to various embodiments, the processor 120 may inform the user that the first application in a transparent state is being executed, through a notification of a specific manner. For example, the processor 120 may inform the user that the first application in the transparent state is being executed, through a status bar, an LED, or a popup.

According to various embodiments, the first application may be automatically transparently executed in a specific condition. For example, when the electronic device is booted, the first application may be automatically executed in a transparent state in a condition, for example, in which an auxiliary device mounted on the electronic device is separated.

According to various embodiments, a transparency of at least a partial area of the screen related to the first application may be changed in a specific condition and the screen related to the first application is output (refer to operations 220 and 230).

In operation 220, the processor 120 may receive a user input. For example, the user input may be a touch input using a part (e.g., a finger) of the body of the user or an input (e.g., a hovering input) using a touch pen. Although a case in which the user input is a hovering input of a touch pen will be mainly discussed in the following, but the present disclosure is not limited thereto. For example, the user input may be a sensor input, such as a motion sensor input, a touch sensor input, a pressure sensor input, a face recognition input, a fingerprint recognition input, or a back surface touch input.

In operation 230, the processor 120 may change a transparency of at least a partial area of the screen of the first application in correspondence to the user input and output the screen of the first application on the display.

For example, when the user makes a hovering input of a touch pen, the processor 120 may output the screen of the first application in an opaque state (e.g., a transparency of 0%) in a circular area of a specific size, which is circular with respect to a point of the hovering input. The user may identify (e.g., identify a message or search the internet) content of the first application displayed in an opaque state through the area.

According to various embodiments, when the user input is changed, the processor 120 may adjust a range, a transparency, and the like of the area, which is processed to be opaque, of the screen of the first application. For example, as the user input is moved on the screen, the processor 120 may move the opaquely processed area according to the user input. As another example, an intensity (e.g., an intensity of a proximity signal of the touch pen recognized by a digitizer, an intensity of a pressure recognized by a force sensor, and an intensity of a touch signal recognized by a touch sensor) of the user input, which is recognized through a sensor or a touch panel becomes weak, the processor 120 may decrease the size of the opaquely processed area, and in contrast, when the intensity of the user input becomes strong, the processor 120 may increase the size of the opaquely processed area.

Figure 2B:
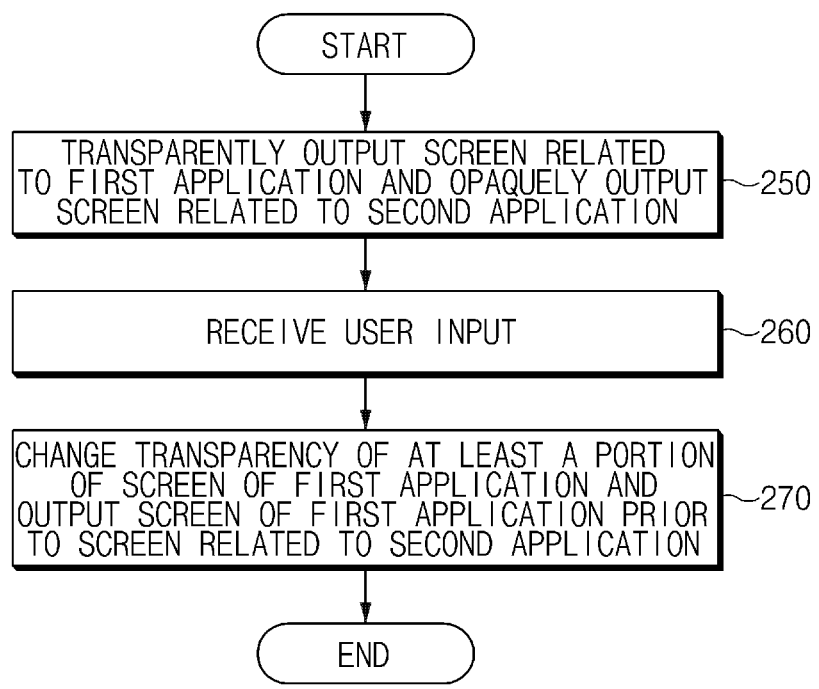
FIG. 2B is a flowchart illustrating a method for outputting screens for a plurality of apps according to various embodiments of the present disclosure.

FIG. 2B is a flowchart illustrating a method for outputting screens for a plurality of apps according to various embodiments of the present disclosure.

Referring to FIG. 2B, in operation 250, the processor 120 may output (or display) the screen (a first screen) related to first application in a transparent state, and may output (or display) the screen (a second screen) related to a second application in an opaque state. The first application and the second application may be different apps, and may be apps including different contents (or objects). The first application and the second application may be one of apps of various forms, such as a message application, an internet browser application, and a shopping application, respectively. The user may not recognize execution of first application in a transparent state, and may determine that only the second application in an opaque state is executed.

According to various embodiments, the processor 120 may load the screen or a layer (e.g., a view) related to the first application in the memory 130, and may display the screen or layer related to the first application on the display 160 based on an input (e.g., a hovering input of a touch pen). According to various embodiments, an area in which the first application in a transparent state is output and an area in which the second application in an opaque state is output may be the same. For example, both the first application in a transparent state and the second application in an opaque state may be output in an entire screen of the display.

According to various embodiments, the first application may not be displayed in a currently executed application list. The user cannot identify execution of the first application in the currently executed application list, and may not be interested in execution of the first application. In various embodiments, when receiving a request (e.g., the user executes the first application separately) for separate execution of the first application, the processor 120 may opaquely process the first application and output the opaquely processed first application on the entire screen.

In operation 260, the processor 120 may receive a user input (e.g., a hovering input of a touch pen). Operation 260 may be the same as or similar to operation 220 of FIG. 2A.

In operation 270, the processor 120 may change a transparency of at least a partial area of the screen of the first application in correspondence to the user input and output the screen of the first application on the display. The processor 120 may output the partial area prior to the screen related to the second application. At least a partial part of the second application with respect to a point of a user input (e.g., a hovering input of a touch pen) may be covered by the execution screen of the first application.

The screen output method according to various embodiments is performed by the electronic device, and may include an operation of transparently outputting a screen related to a first application, an operation of receiving a user input, and an operation of changing a transparency of at least a partial area of the screen of the first application in correspondence to the user input and outputting the screen of the first application.

According to various embodiments, the operation of transparently outputting the screen related to the first application may include an operation of executing the first application in a state in which the screen related to the second application is output opaquely. The operation of changing the transparency of the partial area and outputting the screen of the first application may include an operation of outputting at least a partial area of the screen of the first application prior to the screen related to the second application.

According to various embodiments, the operation of transparently outputting the screen of the first application may include an operation of recognizing connection of an auxiliary device that may be mounted on the electronic device, and an operation of, if the auxiliary device is separated, executing the first application. The operation of changing the transparency and outputting the screen of the first application may include an operation of sequentially changing the transparencies of areas with respect to a point of the user input. The operation of changing the transparency and outputting the screen of the first application may include an operation of changing a range of the partial area based on the change of the user input.

Figure 3:
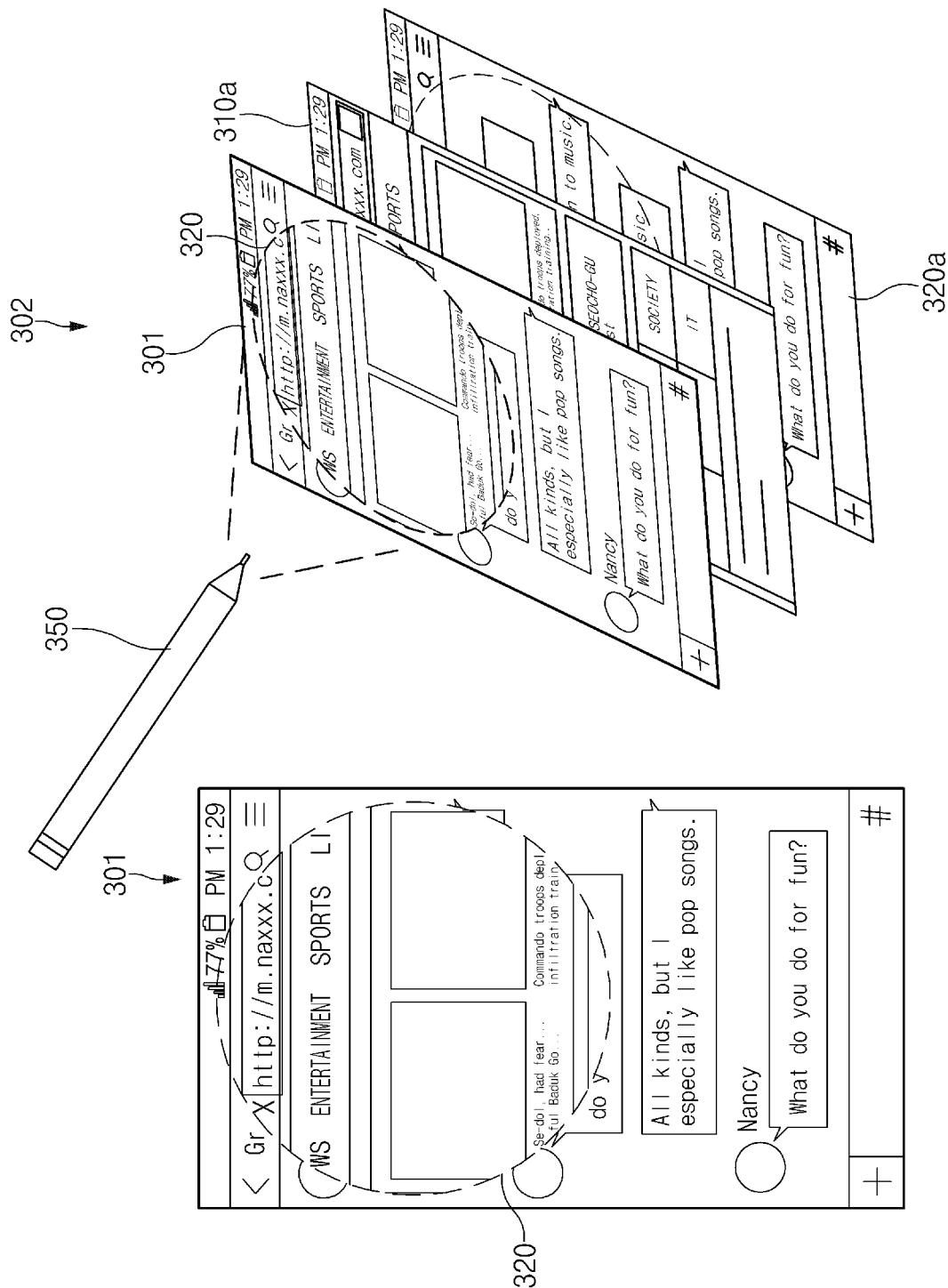
FIG. 3 is a view illustrating a screen of outputting a plurality of apps according to various embodiments of the present disclosure.

FIG. 3 is a view illustrating a screen of outputting a plurality of apps according to various embodiments of the present disclosure.

Referring to FIG. 3, in screen 301, the processor 120 may transparently output a screen related to a first application (e.g., an internet browser application). When a user input (e.g., a hovering input of a touch pen) is made, the processor 120 may change a transparency of at least a partial area (hereinafter, a transparency change area) 320 of the screen related to the first application and output the screen related to the first application.

Meanwhile, the processor 120 may output a screen related to a second application (for example, a message application) in an opaque state. When the user input (e.g., a hovering input of a touch pen), at least a portion of the second application may be covered by the execution screen of the first application.

When a user input (a hovering input of a touch pen) is made, the transparency change area 320 may be formed with respect to a point of the user input. A transparency of at least a portion of the first application may be changed (e.g., from a transparency of 100% to a transparency of 0%) in the transparency change area 320, and then the first application may be output. Content of the first application may be viewed to the user in the transparency change area 320.

In various embodiments, the transparency change area 320 may be output in various forms, and various image effects may be applied to the transparency change area 320. For example, the transparency change area 320 may have a circular or rectangular form, and may have an effect by which the transparency of the transparency change area 320 increases (the transparency change area 320 becomes gradually more transparent) as it becomes far from the center of the transparency change area 320.

In various embodiments, the transparency change area 320 may be moved based on a user input (e.g., a hovering input of a touch pen). For example, when the user moves the location of a touch pen 350 to the upper, lower, left, and right sides, the transparency change area 320 may be moved along the center of the user input (e.g., a hovering input of a touch pen).

In various embodiments, the size of the transparency change area 320 may be changed based on a user input (e.g., a hovering input of a touch pen). For example, when the user makes the location of the touch pen 350 far from the screen, the transparency change area 320 may become smaller or disappear on the screen. In contrast, when the user makes the location of the touch pen 350 gradually closer to the screen, the transparency change area 320 may become gradually larger.

According to various embodiments, the processor 120 may opaquely output the entire execution screen of the first application based on a specific condition. For example, when the touch pen 350 makes a touch input on the screen as the user makes the location of the touch pen 350 gradually closer to the screen, the processor 120 may opaquely output the entire execution screen of the first application.

According to various embodiments, a screen layer related to the first application may be disposed on a layer related to the second application. For example, in the screen diagram 302, the screen related to the first application may be disposed in a first layer 310*a*, and the screen related to the second application may be disposed in a second layer 320*a* disposed under the first layer 310*a*. When the user touches the screen 301 by using a part (e.g., a finger) of the body of the user, the processor 120 may forbid the touch input using a part of the body of the user to be applied to the first application (e.g., an internet browser application) displayed on the first layer 310*a* in a transparent state and may allow the touch input to be applied to the second application displayed on the second layer 320*a*.

According to various embodiments, when the user touches the transparency change area 320 by using a part (e.g., a finger) of the body of the user in a state in which a user input (e.g., a hovering input of a touch pen) is maintained, the touch input may be applied to the first application (e.g., an internet browser application) and may not be applied to the second application (e.g., a message application). In contrast, when the user touches a peripheral area of the transparency change area 320 by using a part (e.g., a finger) of the body of the user in a state in which a user input (e.g., a hovering input of a touch pen) is maintained, the touch input may be applied to the second application (e.g., a message application) and may not be applied to the first application (e.g., an internet browser application).

The screen diagram 302 is provided to illustrate a configuration of the screen, but the present disclosure is not limited thereto. For example, the first application and the second application may be output in one layer. For example, when a hovering input is made, the processor 120 may output content of the first application in the transparency change area 320, and may incorporate images to output content of the second application in the remaining area except for the transparency change area 320. As another example the first layer 310*a* and the second layer 320*a* may be screens including different contents output from one application, respectively.

In an embodiment, the first layer 310*a* and the second layer 320*a* may be widows in the Windows OS, respectively. In another embodiment, the first layer 310*a* and the second layer 320*a* may be views in the Android OS, respectively.

Figure 4:
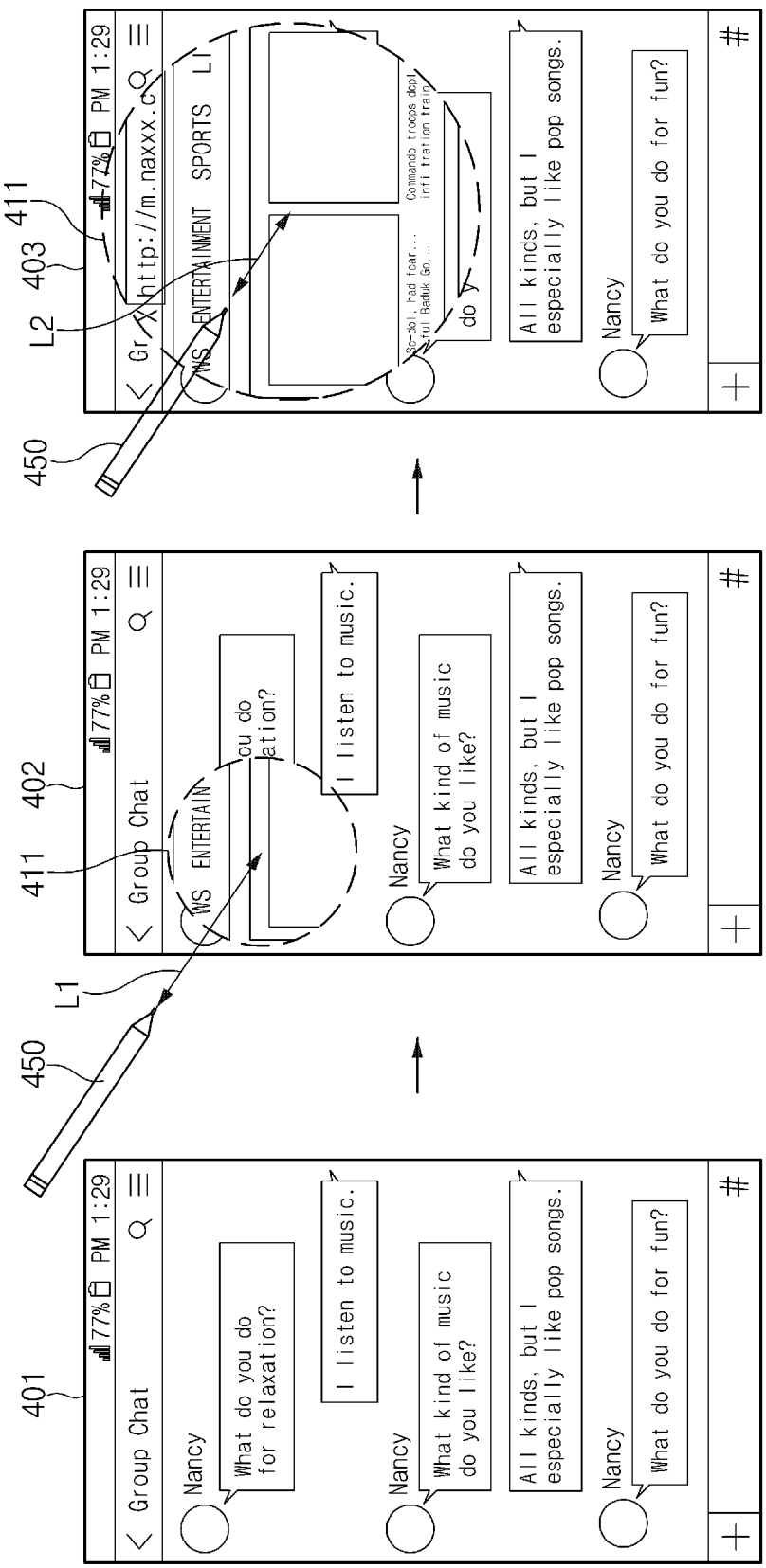
FIG. 4 is a view illustrating a change of a transparency change area based on a change of a user input according to various embodiments of the present disclosure.

FIG. 4 is a view illustrating a change of a transparency change area based on a change of a user input according to various embodiments of the present disclosure. Although FIG. 4 illustrates a case in which the user input is a hovering input of the touch pen, the present disclosure is not limited thereto.

Referring to FIG. 4, in a first screen 401, in a state in which a separate user input (e.g., a hovering input of a touch pen) is not made, the transparent output first application (e.g., an internet browser application) may not be viewed on the screen and only the opaquely output second application (e.g., a message application) may be viewed on the screen. The user may not be aware of or interested in the execution state of the first application output in a transparent state. The user may transmit a message to an external device by using the second application that is a message application, and may identify a message received from an external device.

In a second screen 402, when the user approaches a touch pen 450 towards the screen to a range within a first distance L1, a transparency change area 411 may be formed. The transparency change area 411 may be formed with respect to a point of a hovering input by the touch pen 450. In the transparency change area 411, the screen of the second application may be covered by the screen of the first application.

Although FIG. 4 illustrates a case in which the transparency change area 411 is circular, the present disclosure is not limited thereto. For example, the transparency change area 411 may be rectangular or polygonal. As another example, the transparency change area 411 may change over time (e.g., an animation effect, such as a frame form, may be applied).

According to various embodiments, when the user moves the touch pen 450 and changes the center of the hovering input on the screen, the transparency change area 411 may be moved along the center of the hovering input.

In a third screen 403, when the user moves the touch pen 450 closer to the screen such that the touch pen 450 is moved to a second distance L2 that is closer to the screen than the first distance L1, the size of the transparency change area 411 may gradually increase. When the user intends to expands an area in which content of the first application is displayed, the user may move the touch pen 450 closer to the screen to increase the transparency change area 411.

Although FIG. 4 illustrates a case in which the touch pen 450 approaches the screen, the present disclosure is not limited thereto. For example, when the user makes the touch pen 450 become far away from the screen again while the touch pen 450 is within the first distance L1 from the screen, the transparency change area 411 may become smaller or disappear on the screen.

According to various embodiments, the transparency change area 411 may be changed based on the thickness, tip shape, color, or type of the touch pen 450. For example, when the tip shape of the touch pen 450 is changed, the form of the transparency change area 411 may be changed to the same form as the tip shape of the touch pen 450. As another example, a graphic effect may be applied based on the color of the touch pen 450. As another example, the form of the transparency change area 411 may be changed based on the type of the touch pen 450.

Figure 5:
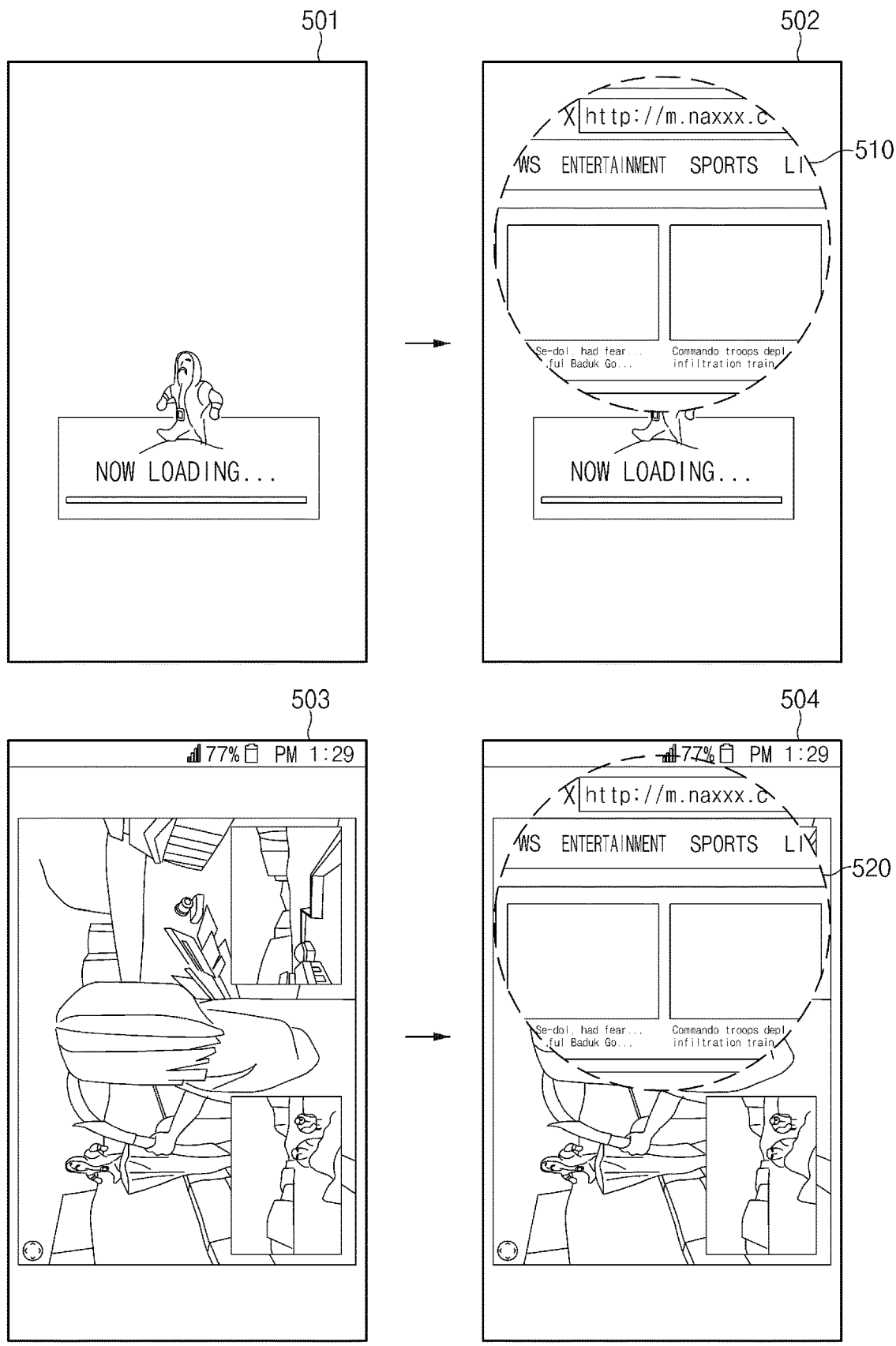
FIG. 5 is a view illustrating a screen of outputting a transparency change area in a game application according to various embodiments of the present disclosure.

FIG. 5 is a view illustrating a screen of outputting a transparency change area in a game application according to various embodiments of the present disclosure. Although FIG. 5 illustrates a case in which the transparently displayed first application is an internet browser application and the opaquely displayed second application is a game application, the present disclosure is not limited thereto.

Referring to FIG. 5, in a first screen 501, the processor 120 may output a first application (e.g., an internet browser application) transparently, and may output a second application (e.g., a game application) opaquely. In a state in which a separate user input (e.g., a hovering input of a touch pen) is not made, the user may identify an execution screen of the second application (e.g., a game application) and may not be aware of or interested in execution of the first application (e.g., an internet browser application).

The processor 120 may opaquely (or on a general application execution screen) output a screen (e.g., a loading screen) on the second application (e.g., a game application). When a game loading screen is output, the user may simply execute the first application (e.g., an internet browser application) by using a touch pen while waiting for loading, and may identify content of the first application.

In a second screen 502, when a user input (e.g., a hovering input of a touch pen) is made, a transparency change area 510 may be formed. The user may move the touch pen to the upper, lower, left, and right sides, and may move the touch pen such that the touch pen becomes closer to or far away from the screen. The transparency change area 510 may be moved on the screen or the size of the transparency change area 510 may be changed as the hovering input of the touch pen is moved. The user may efficiently use a time period for which he or she waits for loading of a game, by identifying simple information through internet browsing while a game loading screen is displayed.

In a third screen 503 and a fourth screen 504, the user may conveniently identify content of the first application (e.g., an internet browser application) by using the touch pen in a state in which the second application (e.g., a game application) is being executed. For example, while the game application is being executed, the user may make a hovering input on the screen by using the touch pen. A transparency change area 520 may be formed with respect to the hovering input. The user may identify a webpage through the transparency change area 520. The user may simply identify another application screen without a separate screen converting operation (e.g., an operation of selecting an internet browser application from an application execution list).

Figure 6:
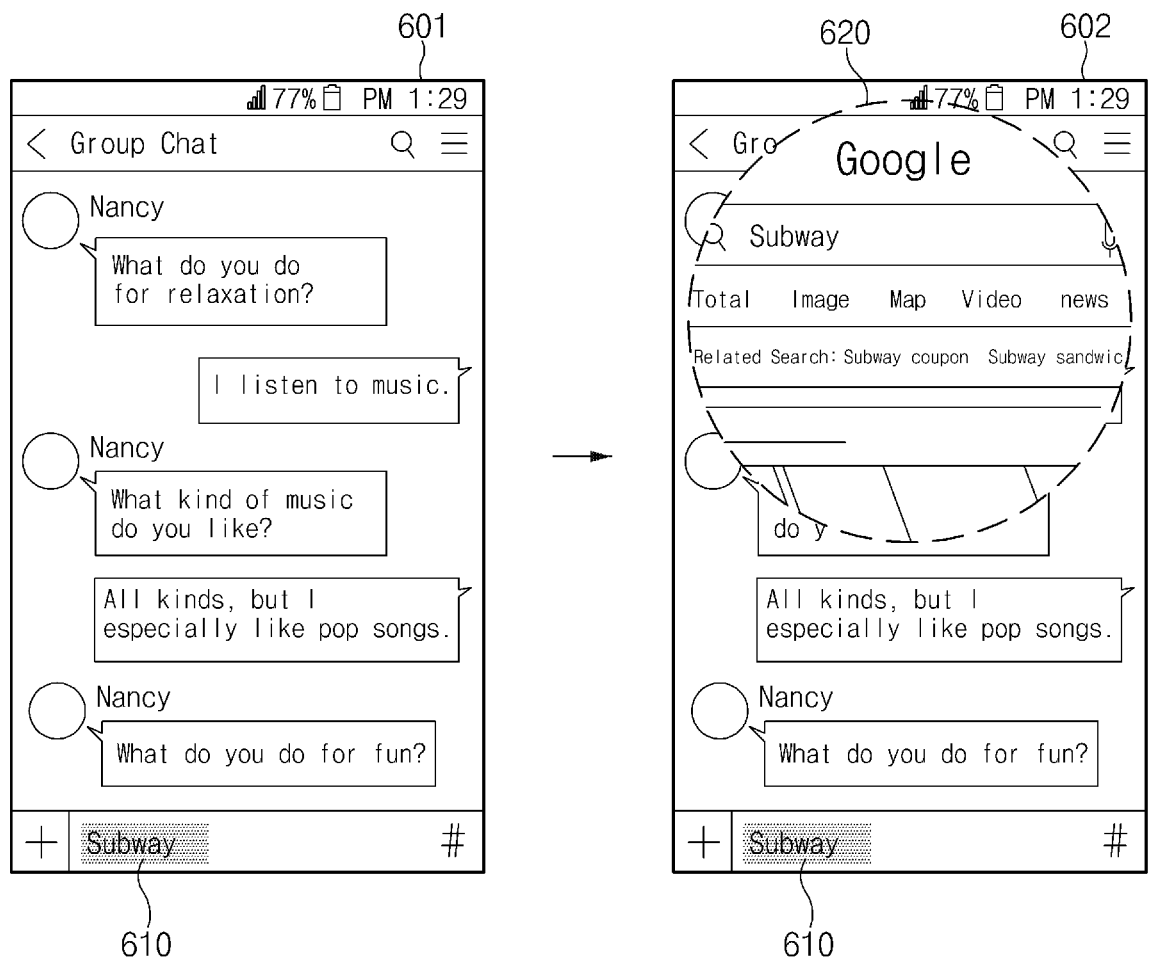
FIG. 6 is a view illustrating a screen of outputting an associated screen in a transparency change area according to various embodiments of the present disclosure.

FIG. 6 is a view illustrating a screen of outputting an associated screen in a transparency change area according to various embodiments of the present disclosure. Although FIG. 6 illustrates a case in which the transparently displayed first application is an internet browser application and the opaquely displayed second application is a message application, the present disclosure is not limited thereto.

Referring to FIG. 6, in a first screen 601, the processor 120 may output a first application (e.g., an internet browser application) transparently, and may output a second application (e.g., a message application) opaquely (or in a general application execution state). In a state in which a separate user input (e.g., a hovering input of a touch pen) is not made, the user may identify an execution screen of the second application (e.g., a message application) and may not be aware of or interested in execution of the first application (e.g., an internet browser application).

In a second screen 602, the processor 120 may output a screen related to at least some contents of the execution screen of the second application (e.g., a message application) in a transparency change area 620. For example, when the user inputs a word to a message application or selects a word from the message application, the processor 120 may search an internet browser application for the corresponding word (e.g., subway 610). When the user makes a hovering input of a touch pen, the processor 120 may form the transparency change area 620 with respect to the hovering input. The processor 120 may output a webpage obtained by searching for the corresponding word (e.g., subway 610) in the transparency change area 620.

According to various embodiments, the processor 120 may perceive content (e.g., a text) of the second application based on the location of the user input (e.g., a hovering input using a touch pen). The processor 120 may use the perceived content (e.g., a text) in the first application based on an execution state of the first application (e.g., an internet browser application). For example, when a hovering input using a touch pen is made, the processor 120 may search for a text that is being input to the message application that is the second application at a time point when the hovering input is made if the internet browser application that is the first application displayed transparently may be searched. Although FIG. 6 illustrates a memo application, the present disclosure is not limited thereto. The user may conveniently search for a word in question by using a dictionary application while reading an electronic book. As another example, the user may select a name or a phone number from a memo application to display a phone number application in which the corresponding name or the phone number is automatically written in the transparency change area 620.

Figure 7:
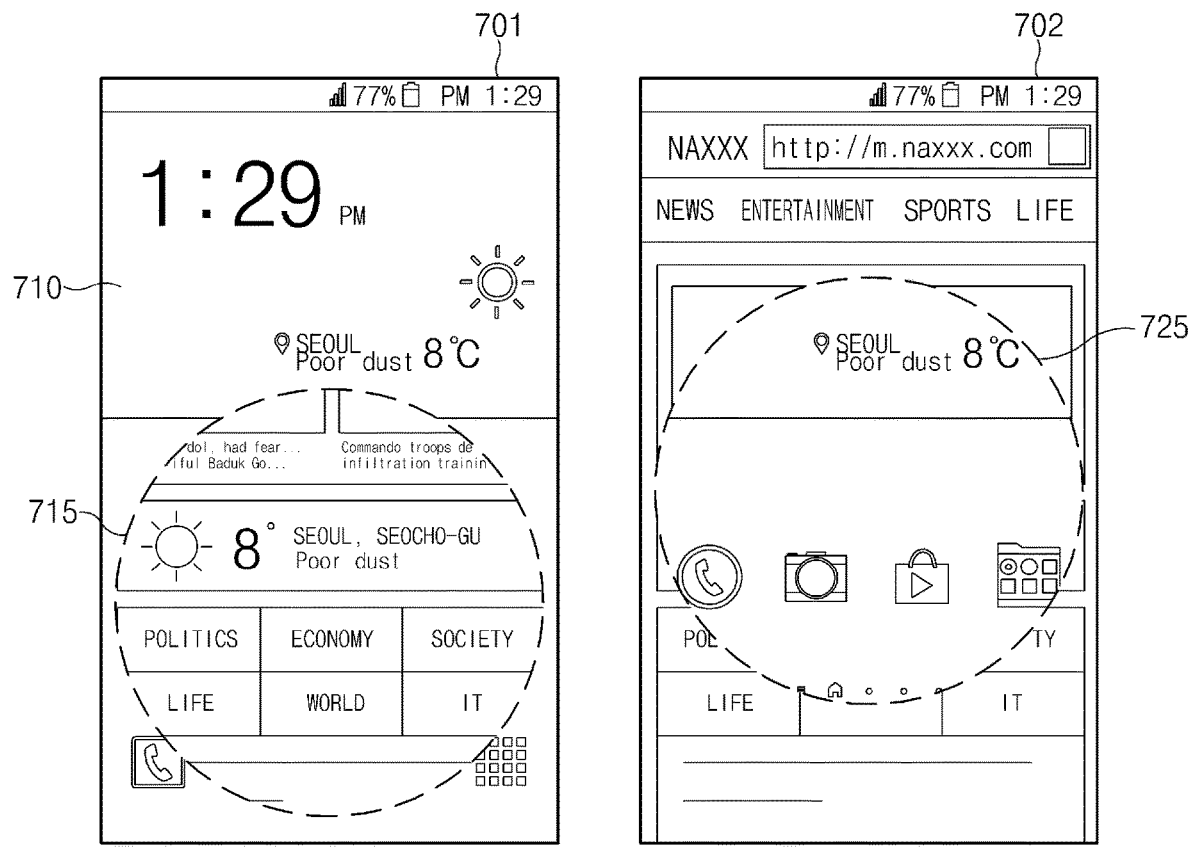
FIG. 7 is a view illustrating a screen of outputting a home screen by using a transparency change area according to various embodiments of the present disclosure.

FIG. 7 is a view illustrating a screen of outputting a home screen by using a transparency change area according to various embodiments of the present disclosure. FIG. 7 is provided as an example and the present disclosure is not limited thereto.

Referring to FIG. 7, in a first screen 701, the processor 120 may transparently output a first application (e.g., an internet browser application) in a state in which a home screen 710 is opaquely output. In a state in which a separate user input (e.g., a hovering input of a touch pen) is not made, the user may identify the home screen 710 and may not be aware of or interested in execution of the first application (e.g., an internet browser application). Although FIG. 7 illustrates a case in which the internet browser application is output, the present disclosure is not limited thereto. For example, when a user input (e.g., a hovering input of a touch pen) is made, a screen of a recently used application may be output in a transparency change area 715.

When a user input (e.g., a hovering input of a touch pen) is made, the transparency change area 715 may be formed. The user may move the touch pen to the upper, lower, left, and right sides, and may move the touch pen such that the touch pen becomes closer to or far away from the screen. The transparency change area 715 may be moved on the screen or the size of the transparency change area 715 may be changed as the hovering input of the touch pen is moved. The user may perform a simple internet search through the transparency change area 715 while the home screen 710 continues to be output. The user may obtain a multi-window or multi-tasking effect through a simple operation (e.g., a hovering input of a touch pen) without a separate conversion of a screen.

In a second screen 702, unlike the first screen 701, the processor 120 may output a home screen in a transparency change area 725. When the user intends to identify an application list included in a home screen while a separate application (e.g., an internet browser application) is being executed, the user may identify an application list included in the home screen through a hovering input of as touch pen even though a separate button input or touch input is not made for progressing to the home screen. In various embodiments, when one of application icons included in the home screen is touched by a part (e.g., a finger) of the body of the user instead of by a touch pen, the selected application may be executed.

Figure 8:
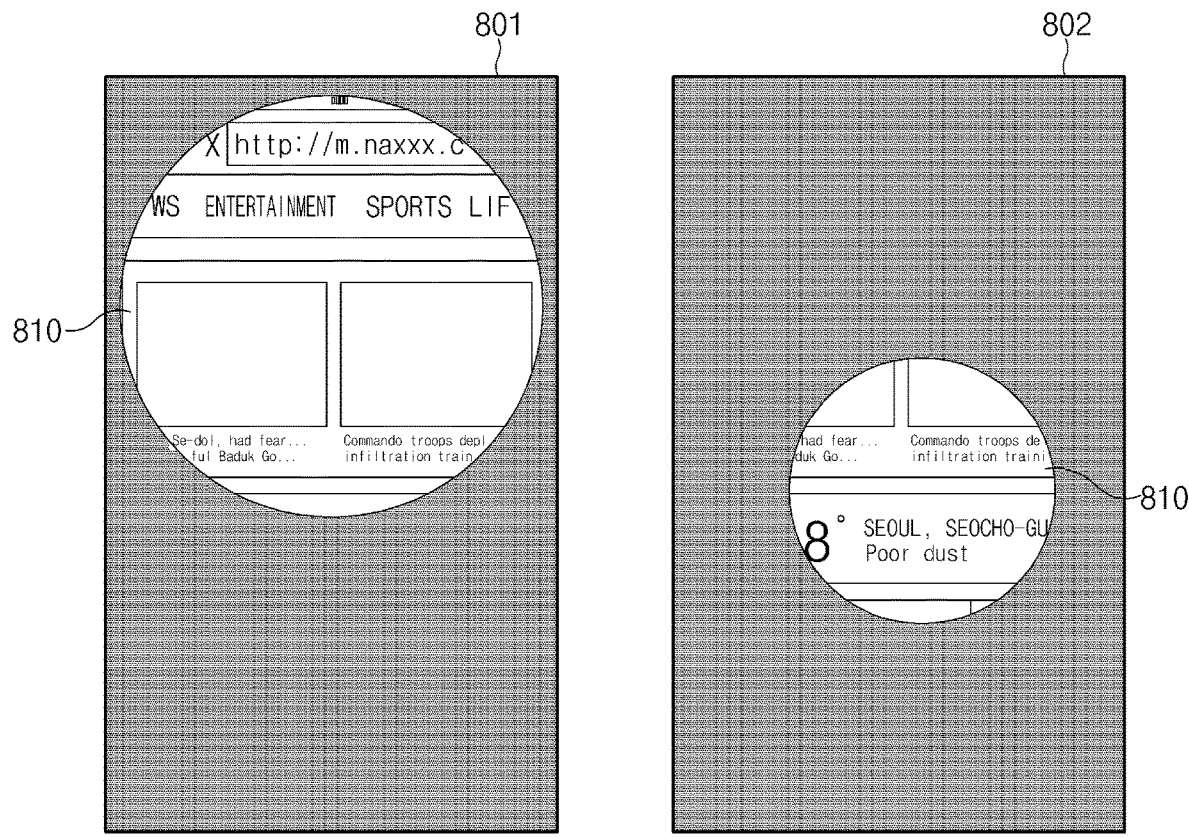
FIG. 8 is a view illustrating output of a screen-off state by using a transparency change area according to various embodiments of the present disclosure.

FIG. 8 is a view illustrating an example of an output of a screen-off state by using a transparency change area according to various embodiments of the present disclosure. FIG. 8 is provided as an example and the present disclosure is not limited thereto.

Referring to FIG. 8, in a screen off state, when recognizing a specific condition (e.g., separation of a touch pen from the electronic device), the processor 120 may turn on the screen based on a situation (e.g., a case in which a hovering input using a touch pen is made), and may generate a transparency change area 810 with respect to a point of the user input (e.g., a hovering input of a touch pen). The processor 120 may output a screen 801 of a first application in the transparency change area 810, and may output the same screen (e.g., a black screen) as the screen off state in a peripheral area of the transparency change area 810.

In various embodiments, the processor 120 may load data regarding a screen related to the first application in the memory in advance, and when a user input is made, may display the data of the memory in the transparency change area 810.

The user may move the touch pen to the upper, lower, left, and right sides, and may move the touch pen such that the touch pen becomes closer to or far away from the screen. As illustrated in screen 802, the transparency change area 810 may be moved on the screen or the size of the transparency change area 810 may be changed as the hovering input of the touch pen is moved.

In a screen off state, the user may conveniently and intuitively identify content of an application (e.g., a message application or an internet browser application) that is being executed, by using the touch pen. The user may have fun to identify the content of the first application, of which the screen is hidden, by using the touch pen, for example, as a flash light.

Figure 9:
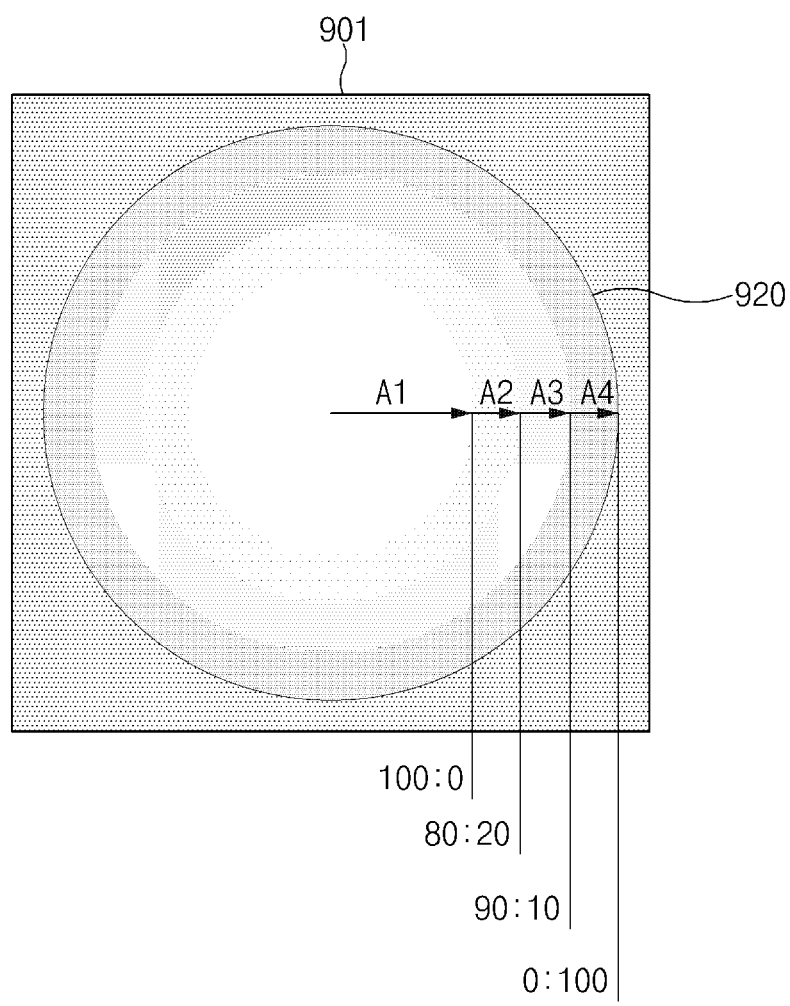
FIG. 9 is a view illustrating a screen of sequentially changing a transparency of a transparency change area according to various embodiments of the present disclosure.

FIG. 9 is a view illustrating a screen of sequentially changing a transparency of a transparency change area according to various embodiments of the present disclosure. Although FIG. 9 illustrates a circular transparency change area, the present disclosure is not limited thereto.

Referring to FIG. 9, when a user input (e.g., a hovering input of a touch pen) is made to a screen 901, the processor 120 may gradually change the transparency of a transparency change area 920. The processor 120 may increase the transparency such that the transparency gradually increases as it becomes far from a point of the user input. For example, the processor 120 may maintain the transparency at 100% to a location of a radius A1 from the point of the user input. The processor 120 may change the transparency such that the transparency becomes 80%, 50%, and 0% as the radius increases by A2, A3, and A4 from the point of the radius A1. Through this, the processor 120 may provide an effect of allowing the user to concentrate on content of a point of the user input.

Figure 10:
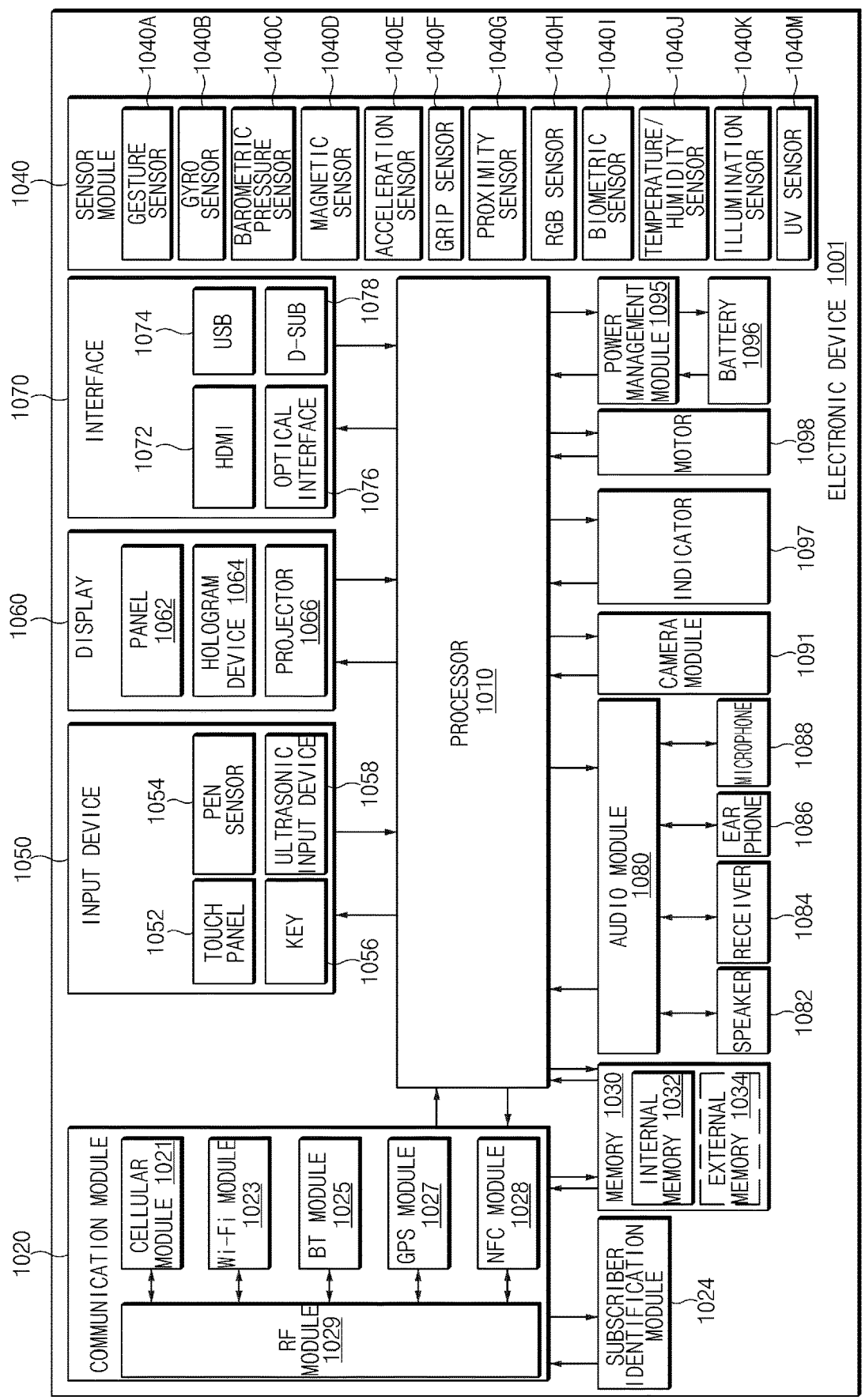
FIG. 10 is a block diagram of an electronic device according to various embodiments of the present disclosure.

FIG. 10 is a block diagram illustrating an electronic device according to an embodiment of the present disclosure.

Referring to FIG. 10, an electronic device 1001 may include, for example, a part or the entirety of the electronic device 101 illustrated in FIG. 1. The electronic device 1001 may include at least one processor (e.g., AP) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an OS or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphics processing unit (GPU) and/or an image signal processor (ISP). The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication interface 170 of FIG. 1. The communication module 1020 may include, for example, a cellular module 1021, a Wi-Fi module 1023, a BT module 1025, a GPS module 1027, an NFC module 1028, and a radio frequency (RF) module 1029.

The cellular module 1021 may provide, for example, a voice call service, a video call service, a text message service, or an Internet service through a communication network. The cellular module 1021 may identify and authenticate the electronic device 1001 in the communication network using the SIM 1024 (e.g., a SIM card). The cellular module 1021 may perform at least a part of functions that may be provided by the processor 1010. The cellular module 1021 may include a CP.

Each of the Wi-Fi module 1023, the BT module 1025, the GPS module 1027 and the NFC module 1028 may include, for example, a processor for processing data transmitted/received through the modules. According to some various embodiments of the present disclosure, at least a part (e.g., two or more) of the cellular module 1021, the Wi-Fi module 1023, the BT module 1025, the GPS module 1027, and the NFC module 1028 may be included in a single integrated chip (IC) or IC package.

The RF module 1029 may transmit/receive, for example, communication signals (e.g., RF signals). The RF module 1029 may include, for example, a transceiver, a power amp module (PAM), a frequency filter, a low noise amplifier (LNA), an antenna, or the like. According to another embodiment of the present disclosure, at least one of the cellular module 1021, the Wi-Fi module 1023, the BT module 1025, the GPS module 1027, or the NFC module 1028 may transmit/receive RF signals through a separate RF module.

The SIM 1024 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1030 (e.g., the memory 130) may include, for example, an internal memory 1032 or an external memory 1034. The internal memory 1032 may include at least one of a volatile memory (e.g., a dynamic random access memory (DRAM), a static RAM (SRAM), a synchronous dynamic RAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a micro-SD, a mini-SD, an extreme digital (xD), a multimedia card (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include, for example, a touch panel 1052, a (digital) pen sensor 1054, a key 1056, or an ultrasonic input device 1058. The touch panel 1052 may employ at least one of capacitive, resistive, IR, and UV sensing methods. The touch panel 1052 may further include a control circuit. The touch panel 1052 may further include a tactile layer so as to provide a haptic feedback to a user.

The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone 1088 so as to identify data corresponding to the ultrasonic waves sensed.

The display 1060 (e.g., the display 160) may include a panel 1062, a hologram device 1064, or a projector 1066. The panel 1062 may have a configuration that is the same as or similar to that of the display 160 of FIG. 1. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-subminiature (D-sub) 1078. The interface 1070, for example, may be included in the communication interface 170 illustrated in FIG. 1. Additionally or alternatively, the interface 1070 may include, for example, a mobile high-definition link (MHL) interface, an SD card/MMC interface, or an infrared data association (IrDA) interface.

The audio module 1080 may convert, for example, a sound into an electrical signal or vice versa. At least a portion of elements of the audio module 1080 may be included in the input/output interface 150 illustrated in FIG. 1. The audio module 1080 may process sound information input or output through a speaker 1082, a receiver 1084, an earphone 1086, or the microphone 1088.

The camera module 1091 is, for example, a device for shooting a still image or a video. According to an embodiment of the present disclosure, the camera module 1091 may include at least one image sensor (e.g., a front sensor or a rear sensor), a lens, an ISP, or a flash (e.g., an LED or a xenon lamp).

The power management module 1095 may manage power of the electronic device 1001. According to an embodiment of the present disclosure, the power management module 1095 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments of the present disclosure, an electronic device includes a memory, a display and a processor electrically connected to the memory and the display, wherein the processor is configured to transparently output a first screen related to a first application, if receiving a user input, change a transparency of at least a partial area of the first screen in correspondence to the user input, and output the first screen on the display.

According to various embodiments, the processor is further configured to opaquely output a second screen related to a second application, and if receiving the user input, output at least a partial area of the first screen prior to the second screen.

According to various embodiments, the processor is further configured to execute the first screen on a first layer and execute the second screen on a second layer disposed under the first layer.

According to various embodiments, the processor is further configured to output the first screen associated with content extracted from the second screen in the partial area.

According to various embodiments, the processor is further configured to perceive the content based on a location of the user input and perform a function associated with the content in the first application based on an execution state of the first application.

According to various embodiments, the processor is further configured to start or end an execution of the first application as an auxiliary device that is connectable to the electronic device is connected to or separated from the electronic device.

According to various embodiments, the processor is further configured to receive a hovering input of a touch pen that is connectable to the electronic device as the user input.

According to various embodiments, the processor is further configured to change a range of the partial area based on a change of the user input.

According to various embodiments, the processor is further configured to sequentially change the transparency of the partial area of the first screen with respect to a point of the user input and output the partial area.

According to various embodiments, the processor is further configured to, when the display receives the user input when the display is in a screen off state, release screen-off of the display, output the first screen in the partial area, and output a screen off screen in another area.

According to various embodiments, the processor is further configured to change the transparency of the partial area in a state in which the display outputs a home screen.

According to various embodiments, the processor is further configured to change a transparency of at least one object constituting the first screen and output the at least one object in the partial area.

According to various embodiments, the processor is further configured to, in a state in which a plurality of applications are being executed, set an application output before an application that is being output on the display as the first application.

According to various embodiments, the processor is further configured to opaquely output an entire execution screen of the first application based on a specific condition.

Figure 11:
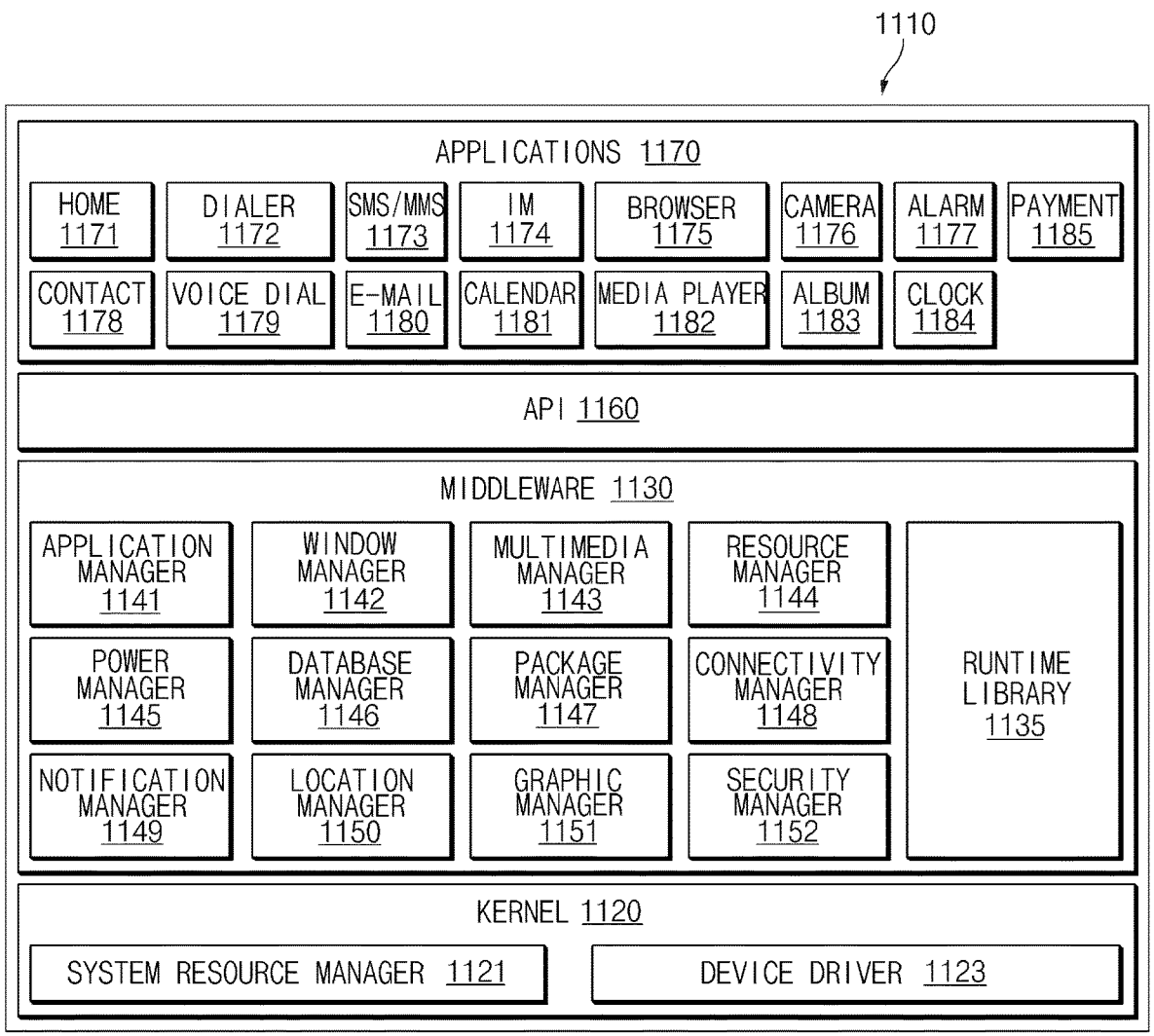
FIG. 11 illustrates a block diagram of a program module according to various embodiments of the present disclosure.

FIG. 11 is a block diagram illustrating a program module according to an embodiment of the present disclosure.

Referring to FIG. 11, a program module 1110 (e.g., the program 140) may include an OS for controlling a resource related to an electronic device (e.g., the electronic device 101) and/or various applications (e.g., the application program 147) running on the OS. The OS may be, for example, Android, iOS, Windows, Symbian, Tizen, or the like.

The program module 1110 may include a kernel 1120, a middleware 1130, an API 1160, and/or applications 1170. At least a part of the program module 1110 may be preloaded on an electronic device or may be downloaded from an external electronic device (e.g., the first external electronic device 102, the second external electronic device 104, or the server 106).

The kernel 1120 (e.g., the kernel 141) may include, for example, a system resource manager 1121 or a device driver 1123. The system resource manager 1121 may perform control, allocation, or retrieval of a system resource. According to an embodiment of the present disclosure, the system resource manager 1121 may include a process management unit, a memory management unit, a file system management unit, or the like. The device driver 1123 may include, for example, a display driver, a camera driver, a BT driver, a shared memory driver, a USB driver, a keypad driver, a Wi-Fi driver, an audio driver, or an inter-process communication (IPC) driver.

The middleware 1130, for example, may provide a function that the applications 1170 require in common, or may provide various functions to the applications 1170 through the API 1160 so that the applications 1170 may efficiently use limited system resources in the electronic device. According to an embodiment of the present disclosure, the middleware 1130 (e.g., the middleware 143) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include, for example, a library module that a compiler uses to add a new function through a programming language while the applications 1170 are running. The runtime library 1135 may perform a function for input/output management, memory management, or an arithmetic function.

The application manager 1141 may mange, for example, a life cycle of at least one of the applications 1170. The window manager 1142 may manage a graphical user interface (GUI) resource used in a screen. The multimedia manager 1143 may recognize a format required for playing various media files and may encode or decode a media file using a codec matched to the format. The resource manager 1144 may manage a resource such as a source code, a memory, or a storage space of at least one of the applications 1170.

The power manager 1145, for example, may operate together with a basic input/output system (BIOS) to manage a battery or power and may provide power information required for operating the electronic device. The database manager 1146 may generate, search, or modify a database to be used in at least one of the applications 1170. The package manager 1147 may manage installation or update of an application distributed in a package file format.

The connectivity manger 1148 may manage wireless connection of Wi-Fi, BT, or the like. The notification manager 1149 may display or notify an event such as message arrival, appointments, and proximity alerts in such a manner as not to disturb a user. The location manager 1150 may manage location information of the electronic device. The graphic manager 1151 may manage a graphic effect to be provided to a user or a user interface related thereto. The security manager 1152 may provide various security functions required for system security or user authentication. According to an embodiment of the present disclosure, in the case in which an electronic device (e.g., the electronic device 101) includes a phone function, the middleware 1130 may further include a telephony manager for managing a voice or video call function of the electronic device.

The middleware 1130 may include a middleware module for forming a combination of various functions of the above-mentioned elements. The middleware 1130 may provide a module specialized for each type of an OS to provide differentiated functions. Furthermore, the middleware 1130 may delete a part of existing elements or may add new elements dynamically.

The API 1160 (e.g., the API 145) which is, for example, a set of API programming functions may be provided in different configurations according to an OS. For example, in the case of Android or iOS, one API set may be provided for each platform, and, in the case of Tizen, at least two API sets may be provided for each platform.

The applications 1170 (e.g., the application program 147), for example, may include at least one application capable of performing functions such as a home 1171, a dialer 1172, a short message service (SMS)/multimedia message service (MMS) 1173, an instant message (IM) 1174, a browser 1175, a camera 1176, an alarm 1177, a contact 1178, a voice dial 1179, an e-mail 1180, a calendar 1181, a media player 1182, an album 1183, a clock 1184, payment 1185, health care (e.g., measure an exercise amount or blood sugar), or environmental information provision (e.g., provide air pressure, humidity, or temperature information).

According to an embodiment of the present disclosure, the applications 1170 may include an information exchange application for supporting information exchange between the electronic device (e.g., the electronic device 101) and an external electronic device (e.g., the first external electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first external electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first external electronic device 102 or the second external electronic device 104) communicating with the electronic device, an application running in the external electronic device, or a service (e.g., a call service, a message service, or the like) provided from the external electronic device.

According to an embodiment of the present disclosure, the applications 1170 may include a specified application (e.g., a healthcare application of a mobile medical device) according to an attribute of the external electronic device (e.g., the first external electronic device 102 or the second external electronic device 104). The applications 1170 may include an application received from an external electronic device (e.g., the first external electronic device 102 or the second external electronic device 104). The applications 1170 may include a preloaded application or a third-party application downloadable from a server. The names of the elements of the program module 1110 illustrated may vary with the type of an OS.

According to various embodiments of the present disclosure, at least a part of the program module 1110 may be implemented with software, firmware, hardware, or a combination thereof. At least a part of the program module 1110, for example, may be implemented (e.g., executed) by a processor (e.g., the processor 1010). At least a part of the program module 1110 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., compact disc ROM (CD-ROM), digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to the screen output method and the electronic device supporting the same according to various embodiments of the present disclosure, the electronic device may transparently output an application, adjust a transparency of the application based on a user input (e.g., a hovering input of a touch pen), and allow a user to conveniently identify a plurality of application screens.

According to the screen output method and the electronic device supporting the same according to various embodiments of the present disclosure, even though a screen is converted to a separate screen, a screen of another application may be output at a portion of the screen by intuitively using an auxiliary device, such as a touch pen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory;
a display; and
a processor electrically connected to the memory and the display,
wherein the processor is configured to:
identify execution of a first application and a second application,
control the display to transparently output a first screen related to the first application,
control the display to opaquely output a second screen related to the second application, based on a user input being moved in a first direction that is perpendicular to the display, control the display to change a transparency of a partial area of the first screen based on a distance of the move in the first direction, which causes the partial area of the first screen to be viewable through the second screen, based on the user input being moved in a second direction that is parallel to the display, control the display to move the partial area in the second direction from a first location to a second location, and control the display to output the partial area, and wherein the move of the partial area from the first location to the second location causes a different area of the first screen to be shown through the second screen.

2. The electronic device of claim 1, wherein the processor is further configured to:
execute the first screen on a first layer, and
execute the second screen on a second layer disposed under the first layer.

3. The electronic device of claim 1, wherein the processor is further configured to:
output the first screen associated with content extracted from the second screen in the partial area.

4. The electronic device of claim 3, wherein the processor is further configured to:
determine the content based on a location of the user input, and
perform a function associated with the content in the first application based on an execution state of the first application.

5. The electronic device of claim 1, wherein the processor is further configured to:
start or end an execution of the first application when an auxiliary device that is connectable to the electronic device is connected to or separated from the electronic device.

6. The electronic device of claim 1, wherein the processor is further configured to:
receive a hovering input, of a touch pen that is connectable to the electronic device, as the user input, and
change the transparency of the partial area based on a change in the first direction of a distance between the display and the touch pen.

7. The electronic device of claim 1, wherein the processor is further configured to:
change a range of the partial area based on a change of the user input.

8. The electronic device of claim 1, wherein the processor is further configured to:
sequentially change the transparency of the partial area with respect to a point of the user input, and
output the partial area.

9. The electronic device of claim 1, wherein the processor is further configured to:
based on the display receiving the user input when the display is in a screen off state, release screen-off of the display,
output the first screen in the partial area, and
output a screen off screen in another area.

10. The electronic device of claim 1, wherein the processor is further configured to:
change the transparency of the partial area in a state in which the display outputs a home screen.

11. The electronic device of claim 1, wherein the processor is further configured to:
change a transparency of at least one object in the first screen and output the at least one object in the partial area.

12. The electronic device of claim 1, wherein the processor is further configured to:
in a state in which a plurality of applications are being executed, set an application output before an application that is being output on the display as the first application.

13. The electronic device of claim 1, wherein the processor is further configured to:
opaquely output an entire execution screen of the first application based on a specific condition.

14. The electronic device of claim 1, wherein the processor is further configured to:
receive a hovering input, of a touch pen that is connectable to the electronic device, as the user input, and
change a size of the partial area based on a distance between the display and the touch pen.

15. The electronic device of claim 1, wherein the processor is further configured to:
detect a touch point on the display, and
change the transparency of the partial area based on a distance between the touch point and the user input.

16. A method of outputting a screen performed by an electronic device, the method comprising:
identifying execution of a first application and a second application;
transparently outputting a first screen related to the first application;
opaquely outputting a second screen related to the second application;
receiving a user input;
based on the user input being moved in a first direction that is perpendicular to a display, changing a transparency of a partial area of the first screen based on a distance of the move in the first direction, which causes the partial area of the first screen to be viewable through the second screen;
based on the user input being moved in a second direction that is parallel to the display, moving the partial area in the second direction from a first location to a second location; and
outputting the partial area,
wherein the moving of the partial area from the first location to the second location causes a different area of the first screen to be shown through the second screen.

17. The method of claim 16, wherein the transparently outputting of the first screen includes:
recognizing a connection of an auxiliary device that is mountable on the electronic device; and
if the auxiliary device is separated, executing the first application.

18. The method of claim 16, wherein the changing of the transparency includes:
sequentially changing the transparency of the partial area with respect to a point of the user input.

19. The method of claim 16, wherein the changing of the transparency includes:
changing a range of the partial area based on a change of the user input.

* * * * *